(12) United States Patent
Nikom

(10) Patent No.: US 6,236,411 B1
(45) Date of Patent: May 22, 2001

(54) METHOD FOR CLASSIFYING ARRANGEMENTS OF GRAPHICAL LINE SEGMENTS

(75) Inventor: Jacob S. Nikom, Needham, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/275,196

(22) Filed: Mar. 24, 1999

(51) Int. Cl.[7] ................................................ G06T 11/20
(52) U.S. Cl. .......................... 345/443; 345/433; 345/421
(58) Field of Search .................................. 345/433, 443, 345/441, 418, 347, 355, 442, 420, 421; 382/176, 178, 199, 203, 224

(56) References Cited

U.S. PATENT DOCUMENTS

| 5,333,248 | * | 7/1994 | Christensen | 345/442 |
| 5,371,845 | * | 12/1994 | Newell et al. | 345/347 |
| 5,579,459 | * | 11/1996 | Jennyc | 345/434 |
| 5,664,081 | * | 9/1997 | Saito | 345/433 |
| 5,748,197 | | 5/1998 | Guibas et al. | 345/438 |
| 5,920,318 | * | 7/1999 | Salvatore, Jr. et al. | 345/418 |
| 5,977,988 | * | 11/1999 | Greene | 345/443 |

* cited by examiner

Primary Examiner—Matthew Luu
Assistant Examiner—Thu-Thao Havan
(74) Attorney, Agent, or Firm—Dirk Brinkman

(57) ABSTRACT

In a method for classifying line segment arrangements. A first line segment has endpoints A and B and a second line segment has endpoints C and D. A first triangle is traced along endpoints ABC, a second triangle is traced along endpoints ABD, a third triangle is traced along endpoints CDA, and a fourth triangle is traced along endpoints CDB. The signed areas of each of the four triangles are determined from the coordinates of the triangles. The arrangement of the line segments is classified according to the signed areas.

8 Claims, 6 Drawing Sheets

METHOD FOR CLASSIFYING ARRANGEMENTS OF GRAPHICAL LINE SEGMENTS

FIELD OF THE INVENTION

The present invention relates generally to a processor-based technique in the field of computational geometry for use in computer graphics and related applications, and more particularly, to techniques for classifying the arrangements of adjacent line segments.

BACKGROUND OF THE INVENTION

Advanced computer graphics technologies have been applied to a wide variety of practical fields such as industrial design, aerospace, consumer electronics, telecommunications, entertainment, and medicine, to name but a few. Important and basic functions of most types of computer-implemented graphics applications are the modeling and visualization of, and the interaction with, represented real-world or imaginary objects. These functions require robust and computationally efficient processes for manipulating the data structures that represent the objects.

For example, numerous medical interventions involve placing a needle, drill, surgical instrument, or other device in the body. In some cases the angle and position of the device with respect to specific body structures is of critical importance, for example in the drilling of a hole for a screw along the axis of a spinal pedicle. In other cases, it is primarily the relative positioning of the instrument in organs which is important, for example, placing a catherization tool in the heart or arteries.

In all of these applications, computer graphics are extensively used, and many of these problems can be modeled in two dimensions (2D) as arrangements of line segments in a plane. The line segments are visualized as pixels on a display device. For example, the outline of the heart chambers and major arteries can be represented as poly-lines, i.e., connected sets of many small line segments. In another example, geographical features contained in maps in geographical information systems may be represented as line segments in a plane.

Fundamental to the functions of interacting with, and the visual display of objects modeled as arrangements of line segments, is the problem of finding and correctly identifying their relative position, for example, do the lines intersect. The line segment intersection problem is also one of the fundamental problems of computational geometry that has received considerable attention.

In a typical prior art formulation of the problem, two line segments are given, and the task is to identify whether the lines intersect each other. Depending on the specification of the problem, two line segments can be considered intersecting when the two lines share a single coordinate point P(x, y) in Euclidean space. Visually this is easy to discern, but computationally this is a relatively difficult task.

For a first line segment defined by end points (x1,y1) and (x2,y2), and a second line segment (x3,y3) and (x4,y4), the common method used to determine if the two line segments intersect includes three major steps.

First, intersect the two line segments as if they were infinite lines using the formulation:

$$x=(b1*c2-b2*c2)/(a1*b2-a2*b1),$$

and $$y=(c1*a2-c2*a1)/(a1*b2-a2*b1),$$

where $$a1=y2-y1, a2=y4-y3, b1=x1-x2, b2=x3-x4,$$

$$c1=(x2 * y2)-(x1 * y2), c2=(x4 * y3)-(x3-y4).$$

Second, check whether the intersection point P(x, y) belongs to the first line segment:

$$x1<=x<=x4, y1<=y<=y4 \text{ or (if } x2<x1 \text{ or } y2<y1)$$

$$x2<=x<=x1, y2<=y<=y1.$$

Third, check whether the intersection point P(x, y) belongs to the second line segment:

$$x3<=x<=x4, y3<=y<=y4 \text{ or (if } x4<x3 \text{ or } y4<y3)$$

$$x4<=x<=x3, y4<=y<=y3.$$

If both conations are true, then coordinate P(x, y) is shared by both line segments, and is their intersection point.

Obviously, this method requires a large number of arithmetic and logical computational steps to determine P(x, y), particularly multiple divisions. This is true even in the case where the lines do not intersect. In addition, the computations need to be performed with real numbers that require substantial computer resources, such as floating-point logic units. The computational costs increase when there are a large number of line segments to be checked. If a significant number of line segments do not intersect, then time and resources are wasted.

It is possible to filter out some non-intersecting line segments using a method described by Berg et al. in "Computational Geometry: Algorithms and Applications," Springer-Verlag, pp.21–22, 1997. In that method, the pair of line segments is projected onto the X and Y axes. If their projection does not overlap, then the lines cannot intersect. However, this is only a necessary, and not a sufficient condition. Projected line segments can overlap without intersecting.

Chazelle et al. in "An optimal algorithm for intersecting line segments in the plane," Journal of the ACM, v. 39 , pp. 1–54, 1992 describe how to identify the intersection of many line segments. Their goal could be formulated as follows. Given a set S of n line segments in a plane, report all intersection points among the line segments S. Their major concern is to organize a search among analyzed segments, and not to miss any intersections without having to intersect every pair of line segments, or to intersect segments more than once.

It is desired to provide a method for determining the intersection of two line segments that represent both necessary and sufficient conditions. In addition, it is desired that this method can be performed without using floating-point computational resources in a minimal number of computational steps. Furthermore, it is desired to determine, in a more general sense, not only intersection, but other relative positions of line segments with respect to each other.

SUMMARY OF THE INVENTION

In a method for classifying line segment arrangements. A first line segment has endpoints A and B and a second line segment has endpoints C and D. A first triangle is traced along endpoints ABC, a second triangle is traced along endpoints ABD, a third triangle is traced along endpoints CDA, and a fourth triangle is traced along endpoints CDB.

The signed areas for each of the four triangles are determined from the coordinates of the triangles. Based on the sign and the areas of the triangles, a classification is made about the arrangement of the line segments.

Only if the sign of the first and second triangle are the different, and the sign of the third and fourth triangles are different, then the two line segments fully intersect each other. Furthermore, in the case that the lines intersect, the computed areas can be used to determine the exact point of intersection.

It can also be determined if the lines semi-intersect, i.e., one of the lines ends exactly at the other line. Other information can also be determined, for example, do the lines form a corner, do the lines overlap, or are the lines aligned along the same axis without overlap. All of these conditions are encountered on a frequent basis in many modem computational geometry applications.

DETAILED DESCRIPTION OF THE PREFERRED EMBODIMENT

Line Segments Defined

Figure 1:
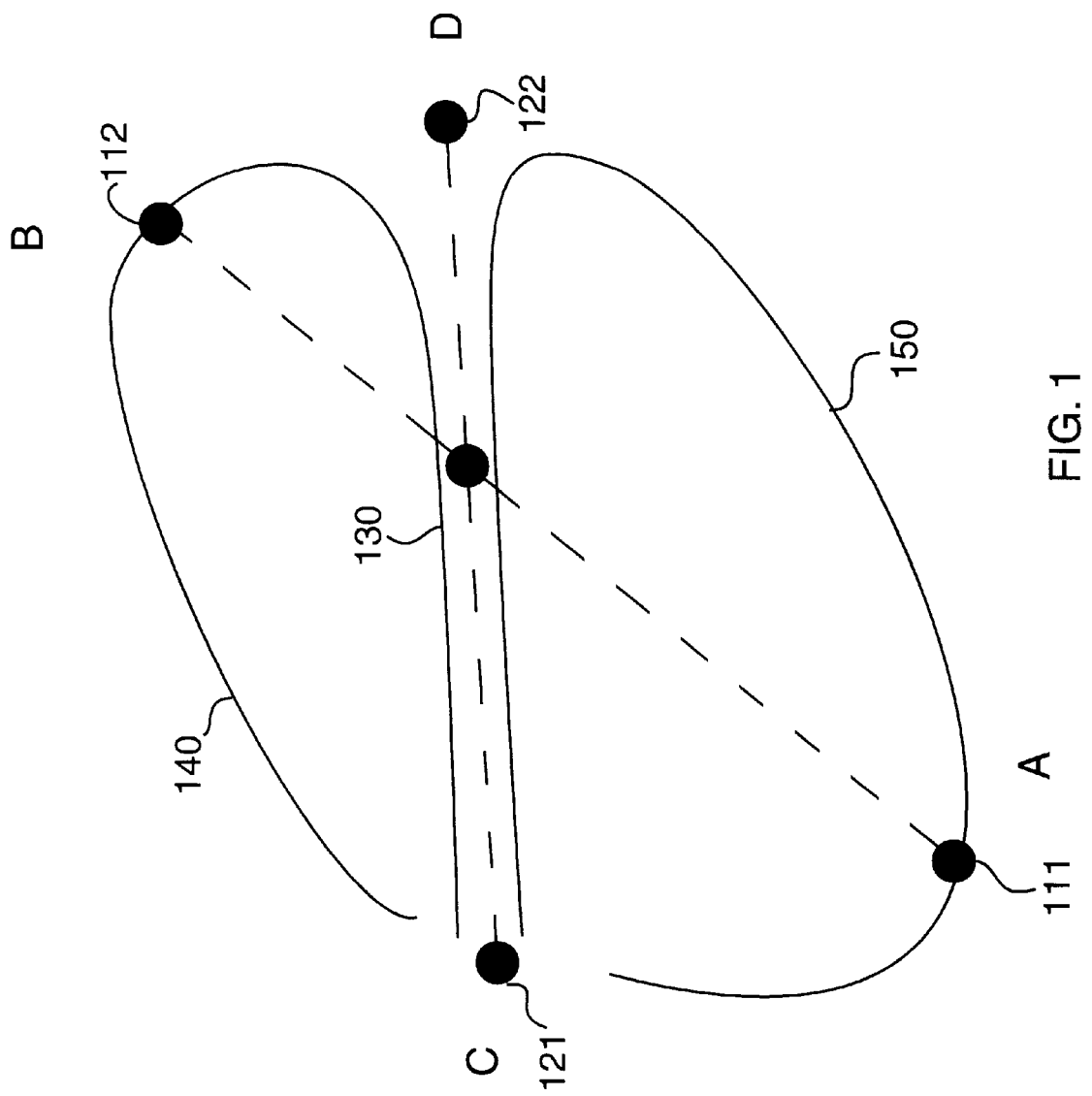
FIG. 1 is a diagram of two intersecting line segments with contours of walking the endpoints of the segments.

FIG. 1 illustrates two non-zero length line segments 110 and 120 in a Euclidean plane. For clarity, the line segments are drawn with dashed lines. Each line segment is specified by a data item that indicates a pair of coordinate values for each of the line's endpoints 111–112 and 121—121 in the plane, using a conventional coordinate system. A line segment endpoint, such as endpoint 111, and an intersection between a pair of line segments, such as intersections 130 are each called a "vertex."

With the line segments according to my invention, the coordinates of the vertices are stored in the data items, not as real numbers, but as integer values. Because my line segments represent outlines of real or imaginary objects in a graphical system, the integer values correspond to pixels in an image plane, and line segments themselves are displayed as a row of fully connected pixels.

My invention determines how two line segments are arranged with respect to each other without completely solving for the coordinates of the various points of interest on the lines, therefore taking fewer computational steps than known solutions of the prior art. For example, my method can classify an an arrangement of two line segments as fully intersecting, semi-intersecting, non-intersecting, overlapping, forming a corner, and so forth. These conditions are important to classify for a broad range of complex graphical object where the possible arrangements of tens of thousands of line segments may need to be considered during a visualization or modeling process.

As an advantage, my invention can use integer computational elements which are more efficient than floating-point units. Also, the integer values of the associated pixels can be stored in fewer bits. My invention represents the necessary and sufficient conditions for full intersection of line segments without resorting to floating-point calculations. Thus, in the case where segments do not intersect, the expense of computing the coordinates of possible points of intersection is not incurred. As a by-product, my method can classify line segments as having other useful conditions.

Walking the Endpoints

My invention is based on topological properties of contours generated by "walking" the endpoints of two line segments. By walking, I mean tracing an outline from one endpoint to another. For convenience of this description, I label the endpoints of the first line segment A and B, and the endpoints of the second line segment C and D.

If the two line segments should intersect, the two endpoints C and D of the second segment must lie on opposite sides of the first line segment AB, and endpoints A and B must lie on opposite side of the second line segment CD.

I define contours by "walking " the endpoints of the line segments AB and CD. The first contour is CDBC 140, and the second contour is CDAC 150. Two additional contours (ABCA and ABDA) are traced by beginning at endpoint A.

For my invention to work, the order of walking is important. For each contour I begin at the same endpoint of one of the two line segments, and walk to the other end. When reaching the far end, I visit first one endpoint of the other line segment for the first contour, and then visit the other endpoint for the second contour before returning to my starting point. I repeat this walk for the second line.

Significantly, for the arrangement of the lines as shown in FIG. 1, i.e., fully intersecting, the first contour is traced in a counter-clockwise direction, and the second contour is traced in a clockwise direction. This is my necessary and sufficient condition for the line segments to intersect.

Non-Intersection

Figure 2:
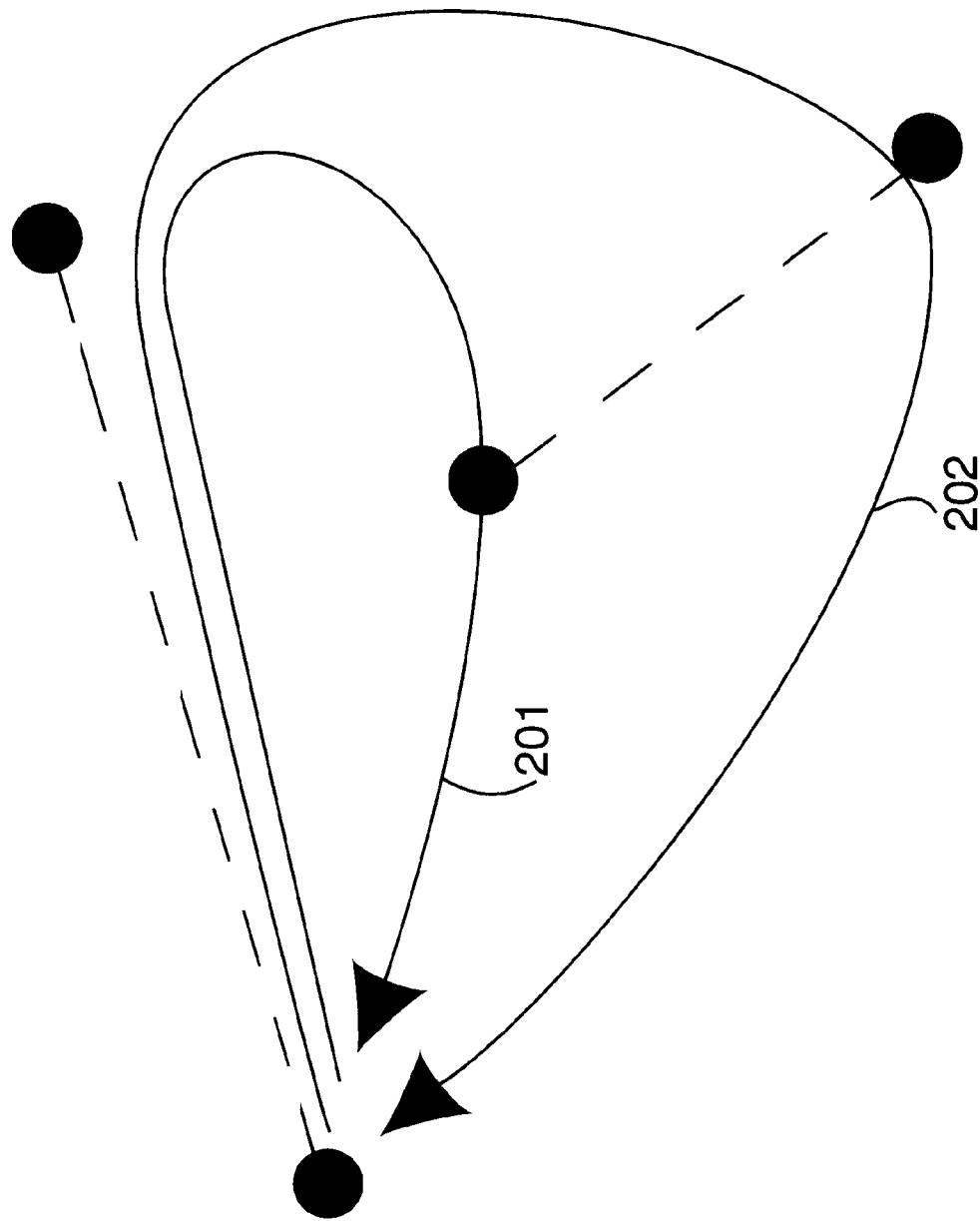
FIG. 2 is a diagram of two non-intersecting line segments with contours.

As shown in FIG. 2 for two non-intersecting line segments, the two contours 201 and 202 are in the same direction because both endpoints lie on the same side of the other line segment. Topologically, the change in direction for the walk is the necessary and sufficient condition for the line segment intersection.

The problems that remain are: how to determine the direction of a particular contour; and how to account for possible degenerate cases which could arise at an intersection of the two line segments, or other possible arrangements, such as, overlap, and comers.

Determining the Direction of a Walking Contour

Geometrically, each of the four traced contours essentially form a triangle. Note, in some interesting arrangements, e.g., semi-intersection, overlap, and comers, some or all of the triangles can be "flat," that is with zero area. However, importantly, even "zero" area triangles have a direction in which they are walked.

I determine the "direction" or orientation of the triangle by computing the sign of an area of the triangle. It is well known that there are many ways to compute the areas of triangles, I prefer one that is computationally efficient and based on the coordinates of the vertices of the triangle as described in "Graphics Gems," Vol. IV, Academic Press, p. 4, 1994.

For an arbitrary triangle ABC, define the coordinates of vertex A as (x1, y1), vertex B as (x2, y2), and vertex C as (x3, y3), and vertex D as (x4, y4). Then, the signed area S of triangle ABC is:

S=0.5*(x1*(y2−y3)+x2*(y3−y1)+x3*(y1−y2)).

Note that this calculation does not require a division. Now, initially, I am only interested in the sign of the area, the magnitude is not of an immediate concern. Therefore, the above formulation can be reduced to:

S=x1*(y2−y3)+x2*(y3−y1)+x3*(y1−y2).

Depending upon the ordering of the vertices, S has either a negative or positive sign, which suits my purpose.

General Case for Full Intersection

By full intersection, I mean that the line segments completely cross each other. Semi-intersection occurs when one line ends or "buts" at another line segment, and to form a corner, two segments touch only at their endpoints.

These special conditions I describe below.

Figure 3:
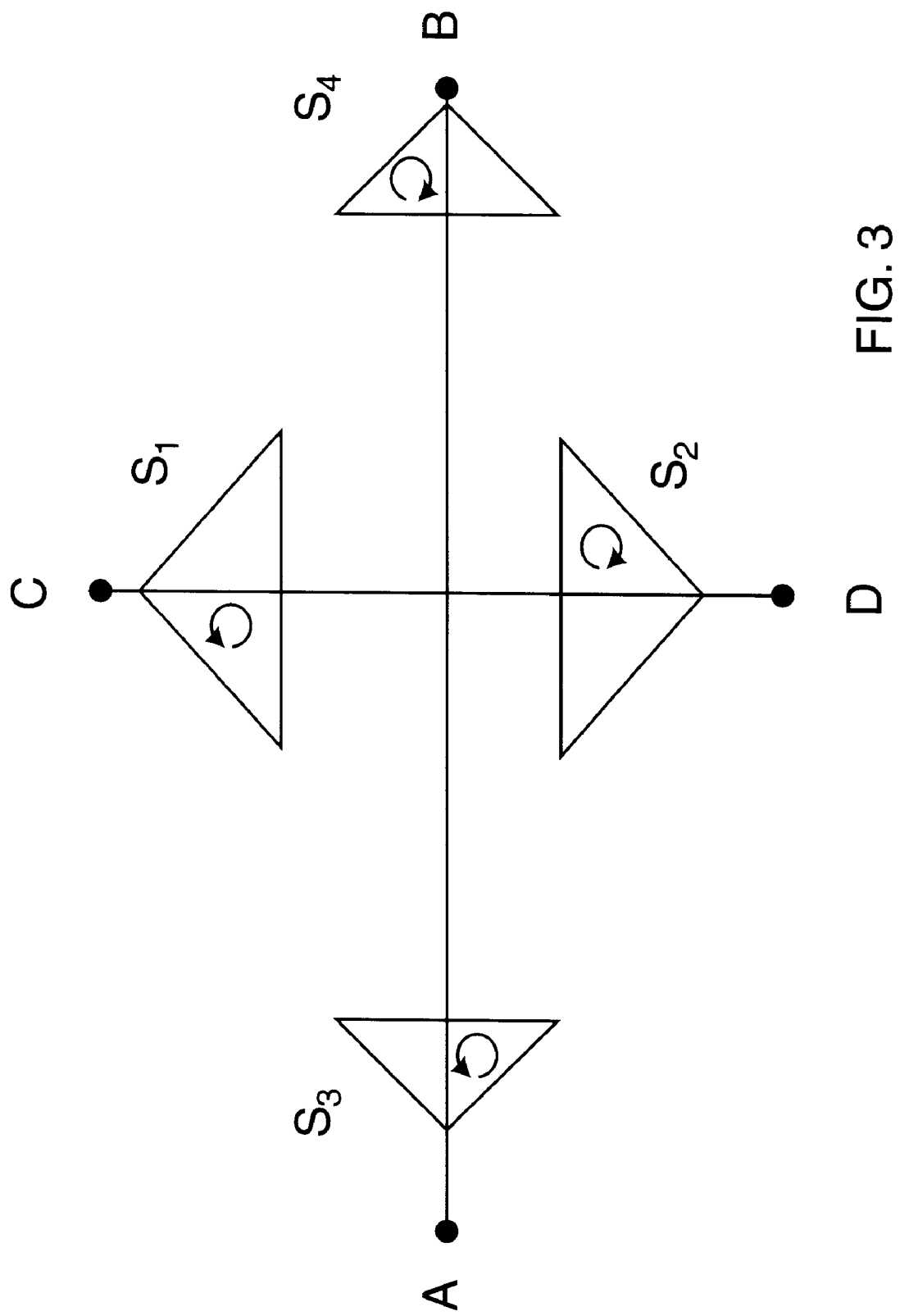
FIG. 3 is a diagram of four contours for two intersecting lines.

As shown in FIG. 3, for line segments AB and CD there are four traced contours respectively having signed areas:

s1=ABC, s2=ABD, s3=CDA, s4=CDB.

To have intersection, it is necessary and sufficient to have two conditions:

s1*s2<0 and s3*s4<0.

That is, the signs of the areas defined by the first pair of contours are different and the signs of the areas defined by the second pair of contours are different. Taking the products of the first and second pairs is a convenient way to make this determination.

The method according to my invention can determine whether or not two lines fully intersect without solving for the actual point of intersection. As an advantage, my method requires fewer and simpler computational steps using only integer arithmetic.

Other Arrangements

FIGS. 4a–4h show other possible cases. For FIGS. 4a–4b, there are four contours:

s1=ABC, s2=ABD, s3=CDA, s4=CDB with a non-intersecting geometrical situation of:

s1*s2<0, s3*s4>0, and a semi-intersection geometrical situation of:

s1*s2<0, s3*s4=0.

Figure 4:
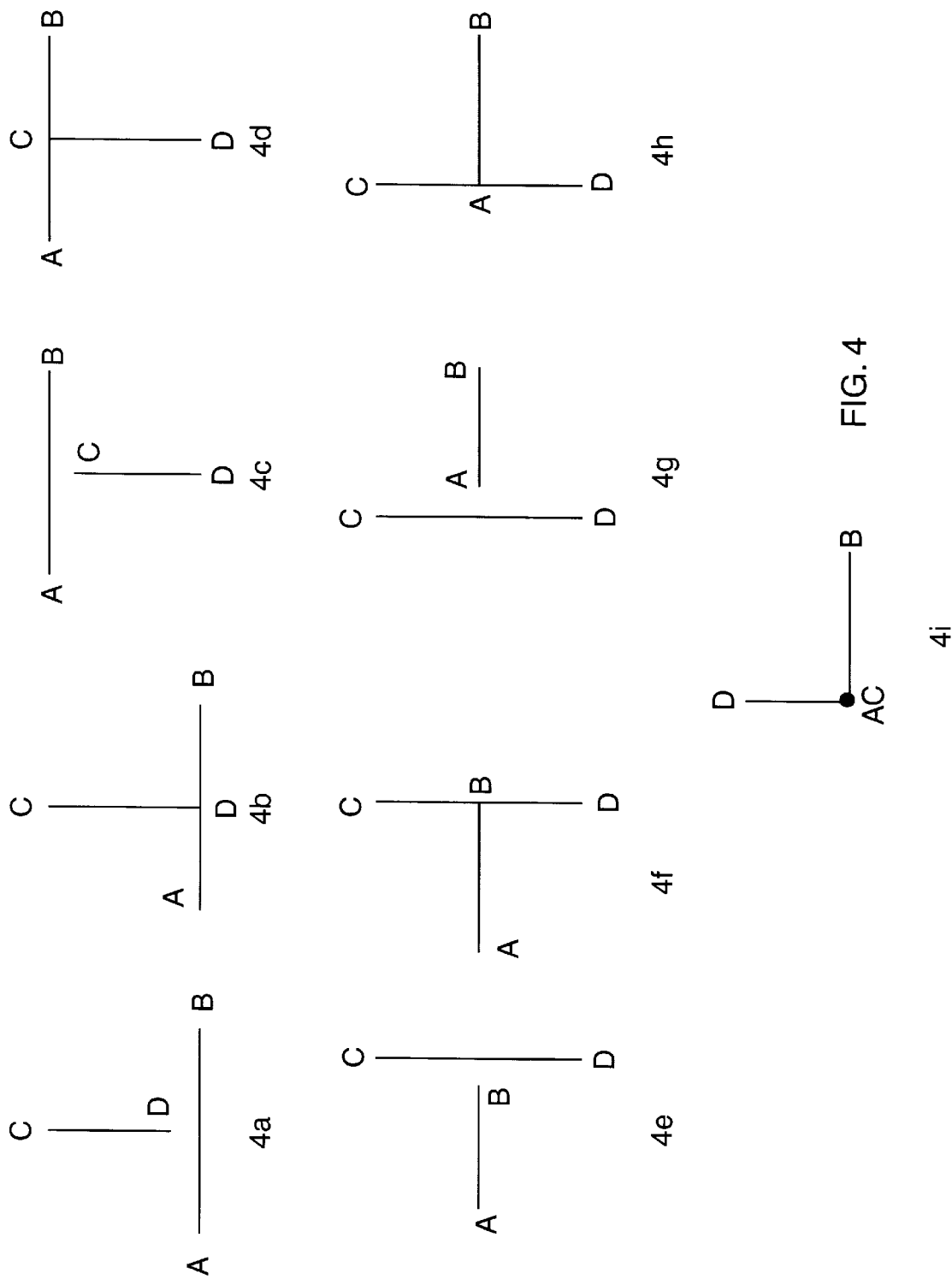
FIGS. 4a–4i illustrate other arrangements of line segments.

For FIGS. 4c–4d, the four contours for the non-intersection geometrical situation yields:

s1*s2<0, s3*s4>0, and a semi-intersection geometrical situation of:

s1*s2<0, s3*s4=0 .

For FIGS. 4e–4f, the four contours for the non-intersection geometrical situation yield:

s1*s2>0, s3*s4<0, and a semi-intersection geometrical situation of:

s1*s2=0, s3*s4<0.

For FIGS. 4g–4h, the four contours for the non-intersection geometrical situation yield:

s1*s2>0, s3*s4<0, and a semi-intersection geometrical situation of:

s1*s2=0, s3*s4<0.

Note, for non-intersection, the signs of both of the pairs are always different. For the semi-intersection, the signs of the areas defined by one pair of contours are different and the areas of one of the other pair of contours is zero. Therefore, my method can also differentiate full from semi-intersections. In the case of a corner as shown in FIG. 4i, each pair has one triangle of zero area. It should now be apparent, that for overlapping line segments all of the triangles have zero area.

Determining the Coordinates of the Intersection Point

Figure 5:
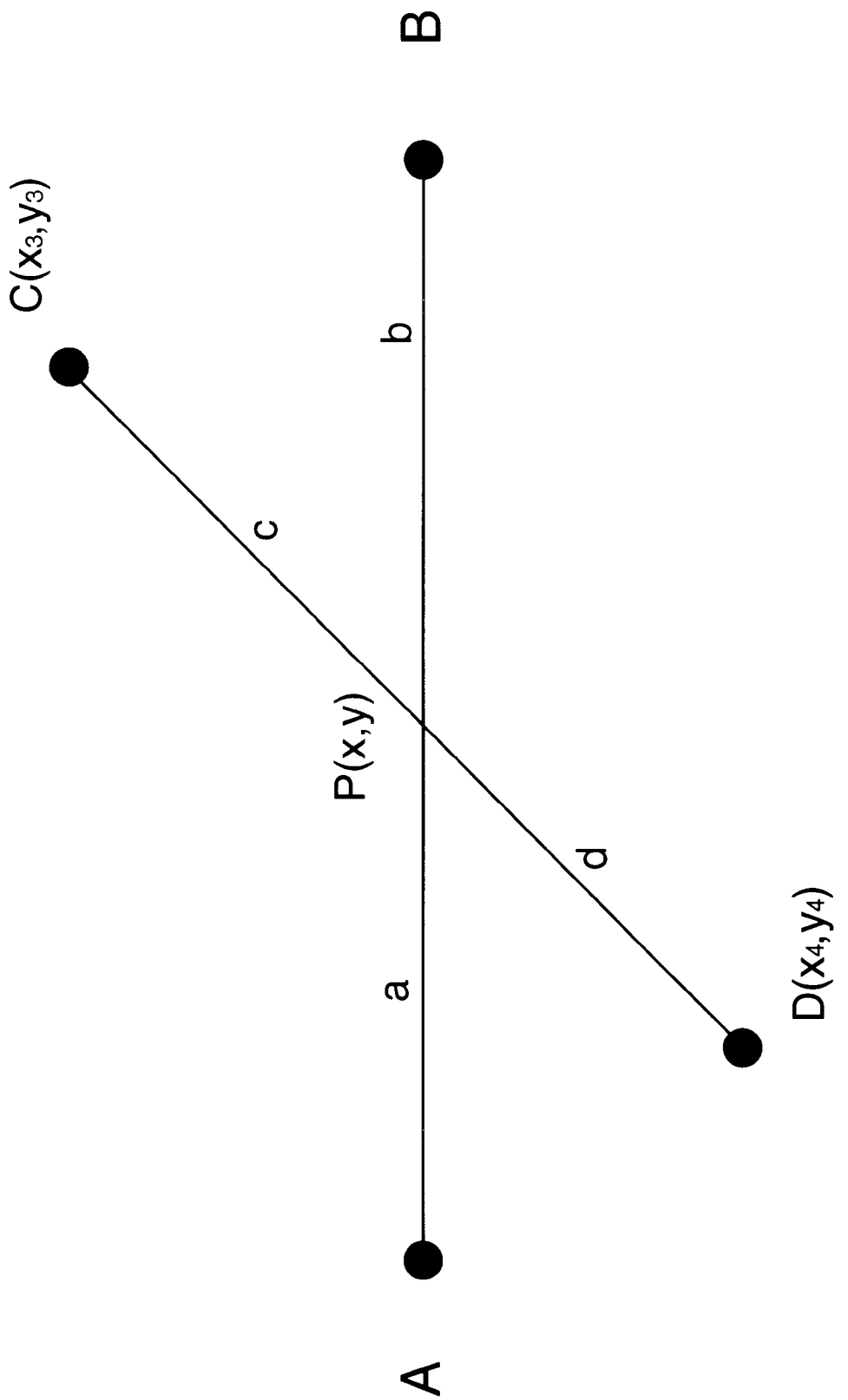
FIG. 5 is a diagram of two line intersecting at a point P(x, y)

My method for calculating the signs of areas defined by walking contours in particular order can also be used to determine the point of intersection P(x,y), should one exist. FIG. 5 shows two intersecting line segments AB and CD. The segments intersect at the P(x,y). To find the location of this point, I use the ratio of the area of triangles ABC=s1 and ABD=s2 and the coordinates of the end point C(x3, y3) and D(x4, y4). Denote PD as d and PC as c. Then, the following ratio holds true:

s1/s2=c/d.

Consequently, the coordinates (x, y) of intersection point P can be calculated by:

$$x = \frac{|s2|*x3+|s1|*x4}{|s1|+|s2|}, y = \frac{|s2|*y3+|s1|*y4}{|s1|+|s2|}$$

The same formulae could be rewritten for s3 and s4 and parts a and b of line segment AB with end point A(x1, y1) and end point B(x2, y2) as:

$$x = \frac{|s4|*x1+|s3|*x2}{|s3|+|s4|}, y = \frac{|s4|*y1+|s3|*y2}{|s3|+|s4|}$$

Note, the values s1, s2, s3, and s4 are already known from above, and the remaining values are simply the coordinates of the endpoints of the lines.

Figure 6:
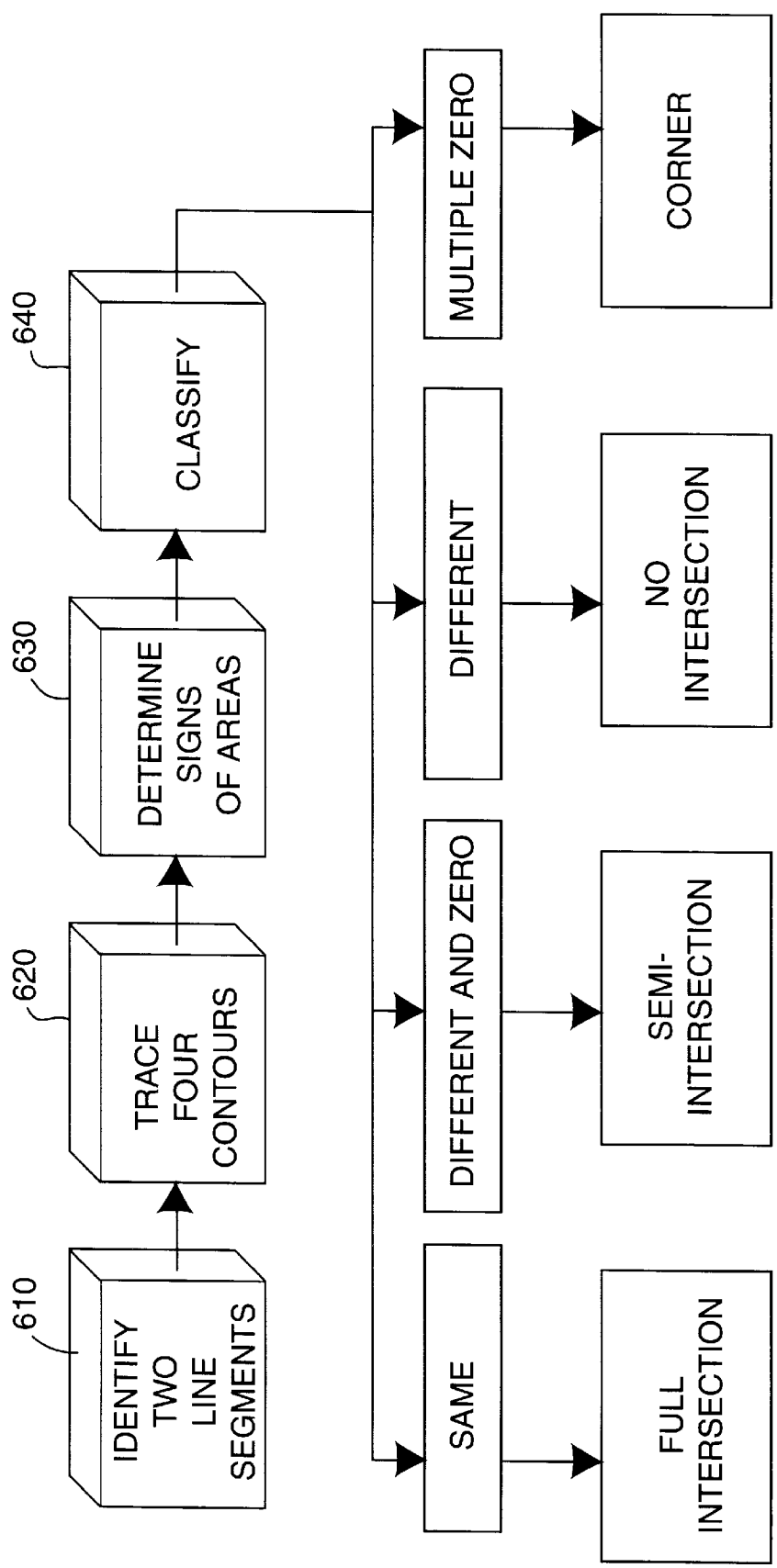
FIG. 6 is a flow diagram of a process for determining line segment intersection according to the invention.

As shown in FIG. 6, a process for classifying the arrangement of two line segments according to the invention includes the following steps. Define the endpoints of two line segments in step 610. Trace four contours around the endpoints in step 620. Determine the signs of the areas for the contours in step 630. Classify the line segments in step 640 according to the signs of the areas of the contours.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for classifying arrangements of line segments, wherein a first line segment has endpoints A and B and a second line segment has endpoints C and D, comprising the steps of:

tracing a first triangle ABC, a second triangle ABD, a third triangle CDA, and a fourth triangle CDB using the endpoints of the line segments;

determining the signed area for each of the traced triangles;

classifying the arrangement position of the first line segment with respect to the second line segment according to the signed areas.

2. The method of claim 1 wherein the coordinates of the line segments are integer values representing pixel positions of an image plane.

3. The method of claim 1 wherein the two line segments are classified as fully intersecting if, and only if, the signs of the first and second areas are different, and the signs of the third and fourth areas are different.

4. The method of claim 1 wherein the line segments are classified as semi-intersecting if, and only if, the signs of the first and second areas are different, and either the third or fourth area is zero.

5. The method of claim 1 wherein the line segments are classified as co-axial if, and only if, all of the areas are zero.

6. The method of claim 1 wherein the line segments form a corner if, and only if, either the first or second area is zero, and either the third or fourth area is zero.

7. The method of claim 1 wherein the coordinates of A, B, C, and D respectively are (x1, y1), (x2, y2), (x3, y3), and (x4, y4), and the area S of triangle ABC is $S = x1*(y2-y3) + x2*(y3-y1) + x3*(y1-y2)$.

8. The method of claim 1 wherein the areas of the first two triangles respectively are s1 and s2, and the intersection is located on the second line segment at a point having a ratio of s1/s2.

* * * * *